(12) United States Patent
Jiang

(10) Patent No.: US 9,191,108 B2
(45) Date of Patent: Nov. 17, 2015

(54) TECHNIQUES FOR LOW POWER VISUAL LIGHT COMMUNICATION

(71) Applicant: Intel Corporation, Santa Clara, CA (US)

(72) Inventor: Yong Jiang, Shanghai (CN)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/128,609

(22) PCT Filed: Jul. 16, 2013

(86) PCT No.: PCT/CN2013/079438
§ 371 (c)(1),
(2) Date: Dec. 22, 2013

(87) PCT Pub. No.: WO2015/006911
PCT Pub. Date: Jan. 22, 2015

(65) Prior Publication Data
US 2015/0023669 A1    Jan. 22, 2015

(51) Int. Cl.
*G06K 7/10*        (2006.01)
*H04B 10/116*    (2013.01)
(52) U.S. Cl.
CPC .................................. *H04B 10/116* (2013.01)
(58) Field of Classification Search
USPC ........................................... 235/375, 462.01
See application file for complete search history.

(56) References Cited

U.S. PATENT DOCUMENTS

2007/0071320 A1    3/2007 Yada
2011/0221779 A1    9/2011 Okumura et al.
2013/0162676 A1    6/2013 Taylor

FOREIGN PATENT DOCUMENTS

CN              102693409             9/2012

OTHER PUBLICATIONS

Perli et al., "PixNet: Interference-Free Wireless Links Using LCD-Camera pairs", Mobi-com'10, Sep. 20-24, 2010, 12 pages.
Hao et al., "COBRA: Color Barcode Streaming for Smartphone Systems", Dept. of Computer Science and Engineering, Michigan State Univ., Jun. 25, 2012, 14 pages.
International Search Report and Written Opinion received for PCT Patent Application No. PCT/CN2013/079438, mailed Apr. 30, 2014, 15 pages.

*Primary Examiner* — Daniel Hess
(74) *Attorney, Agent, or Firm* — Kacvinsky Daisak Bluni PLLC

(57) ABSTRACT

Various embodiments are generally directed to techniques for reducing the consumption of electric power in decoding VLC frame patterns by selectively decoding data patterns based on an analysis of marker patterns. A device to receive data in visual light communications includes a processor component; and a decoding component for execution by the processor component to analyze a marker pattern of a frame pattern in a captured image to determine whether the frame pattern is a useful frame pattern, and to selectively decode a data pattern of the frame pattern to retrieve a packet of data based on the analysis. Other embodiments are described and claimed.

25 Claims, 14 Drawing Sheets

TECHNIQUES FOR LOW POWER VISUAL LIGHT COMMUNICATION

TECHNICAL FIELD

Embodiments described herein generally relate to reducing power consumption in decoding data patterns optically transmitted by visual light communication.

BACKGROUND

Visual light communication (VLC) in which data is encoded into at least one visual data pattern of at least one frame pattern visually presented on a display of a sending device for capture by a camera of a receiving device has gained acceptance as an alternative to radio frequency (RF) communication of data. VLC has inherent security advantages over RF communications including being considerably more difficult to intercept as VLC is literally a form of line-of-sight communications. VLC is also able to be used in environments in which RF communications may not be permitted, such as on board aircraft where safety concerns exist over RF communications interfering with navigation systems.

As familiar to those skilled in sampling techniques, including the Nyquist-Shannon sampling theory, the rate at which the camera of the receiving device captures images of the frame patterns should be no less than twice the rate at which those patterns are visually presented on the display of the sending device to avoid data loss due to aliasing. Given that displays of typical computing devices are refreshed at a wide range of rates from 30 to 85 times per second, the capturing of images of frame patterns may need to be performed at a rate as high as 190 times per second.

Unfortunately, a high proportion of the captured images will be of no value. As many as half of the captured images will be of a new frame pattern amidst the process of being rendered onto the display to replace a previous frame pattern such that the captured image appears to include a frame pattern, but the apparent frame pattern is actually an unusable mixture of portions of two frame patterns. Others of the captured images may include a duplicate of a frame pattern already successfully captured in the previous captured image.

To distinguish captured images of unusable mixtures of frame patterns and of duplicates of frame patterns from useful captured images of frame patterns, the receiving device must attempt to decode whatever frame pattern may be included in each captured image. Thus, the receiving device may have to attempt to decode as many as 190 frame patterns per second, where no more than half will turn out to be useful frame patterns. These attempts at decoding frame patterns include decoding the data pattern and may also include performing a checksum or other check of integrity of the data pattern as part of distinguishing a mixture of two data patterns arising from an unusable mixture of two frame patterns from a single intact data pattern.

Each such attempt at decoding requires considerable processing resources, and accordingly, a considerable amount of electric power. With at least half of those frame patterns being of no value, the result is a waste of at least half of the electric power employed in such attempted decoding. This can become a significant issue where the receiving device relies upon a battery for the electric power to perform such attempts at decoding.

DETAILED DESCRIPTION

Figure 1:
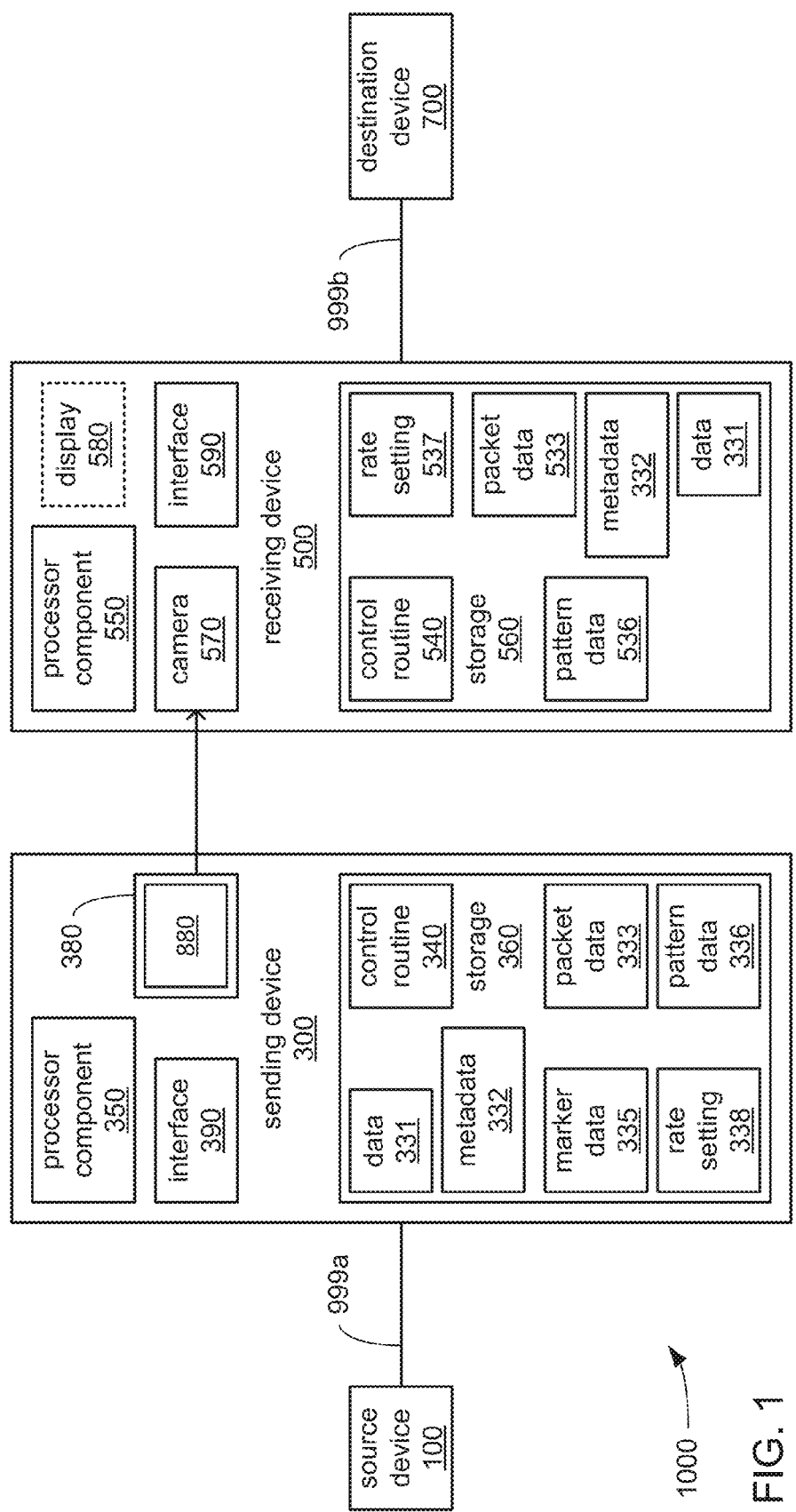
FIG. 1 illustrates an embodiment of a visual light communications (VLC) system.

Various embodiments are generally directed to techniques for reducing the consumption of electric power in decoding VLC frame patterns by selectively decoding data patterns based on an analysis of marker patterns. For each captured image of what is displayed by a sending device, the receiving device first analyzes the marker pattern incorporated into the frame pattern captured in that captured image to distinguish useful frame patterns from either unusable or duplicate frame patterns. For each useful frame pattern, the receiving device decodes the data pattern incorporated into the frame pattern.

The marker pattern is selected to occupy a relatively small portion of the frame pattern and to be relatively simple to analyze. In this way, only a relatively simple marker pattern need be analyzed initially for each captured image, instead of the larger and more complex data pattern, thereby achieving a significant reduction in power consumption for the receiving device. Also, the marker pattern is selected to alternate among two or more different states to enable a relatively simple determination of when a new frame pattern has been rendered on the display of the sending device. Further, portions of the marker pattern are disposed about the periphery of the data pattern to enable relatively simple identification of unusable frame patterns arising from image captures occurring as a new frame pattern is being rendered onto the display of the sending device to replace a previous frame pattern.

The sending device organizes data into one or more data frames. Each data frame is then encoded into a data pattern of a frame pattern for visual presentation on a display of the sending device at a selected display rate. In some embodiments, metadata associated with the data (e.g., a file name of a file in which the data is stored, a data size for the data, a cyclic redundancy check value to confirm the data is intact as received, etc.) may also be encoded into at least one data pattern into which the data has been encoded to ensure conveyance of the metadata to the receiving device along with the data. In still other embodiments, an indication of the display rate may also be encoded into a portion of one or more frame patterns visually presented on the display to enable the receiving device to select a capture rate based on the display rate.

The receiving device recurringly captures images of the display of the sending device at its capture rate. As previously discussed, the capture rate may be selected to be twice the display rate at which the sending device visually presents frame patterns on its display. The receiving device analyzes the marker pattern of the frame pattern in each captured image of a frame pattern to distinguish useful frame patterns from either duplicate or unusable frame patterns. The receiving device then decodes the data pattern of each frame pattern identified as a useful frame pattern to retrieve the data therefrom. In embodiments in which metadata associated with the data is also encoded into one or more of the data patterns, the receiving device may also retrieve the metadata from its decoding of the data pattern(s). In still other embodiments, the receiving device may also retrieve an indication of the display rate from its decoding of a portion of a frame pattern.

To further reduce consumption of electric power, the receiving device may attempt to synchronize its analysis of marker patterns with the display rate of the sending device. Thus, the receiving device may attempt to limit analysis of marker patterns to only the marker patterns of frame patterns in captured images determined to be likely to include a useful frame pattern based on a determination of a rate at which the captured images have been determined to have useful frame patterns.

With general reference to notations and nomenclature used herein, portions of the detailed description which follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 illustrates a block diagram of an embodiment of a visual light communications (VLC) system 1000 incorporating one or more of a source device 100, a sending device 300, a receiving device 500 and a destination device 700. In the VLC system 1000, data is encoded into data patterns within frame patterns that are visually presented by the sending device 300 for image capture and decoding by the receiving device 500. The sending device 300 may receive the data from the source device 100 and/or the receiving device 500 may transmit the data onward to the destination device 700. Each of these computing devices 100, 300, 500 and 700 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc.

As depicted, the computing devices 100 and 300 may exchange signals conveying data to be transmitted by VLC through a network 999a, and computing devices 500 and 700 may exchange signals conveying the data following its receipt by VLC through a network 999b. However, one or more of these computing devices may exchange other information entirely unrelated to data transmitted by VLC with each other and/or with still other computing devices (not shown) via one or both of the networks 999a and 999b. In various embodiments, the network may be a single network that may be limited to extending within a single building or other relatively limited area, a combination of connected networks that may extend a considerable distance, and/or may include the Internet. Thus, the network 999 may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the sending device 300 incorporates one or more of a processor component 350, a storage 360, a display 380 and an interface 390 to couple the sending device 300 to the network 999a. The storage 360 stores one or more of data 331, metadata 332, packet data 333, marker data 335, pattern data 336, a rate setting 338 and a control routine 340. The control routine 340 incorporates a sequence of instructions operative on the processor component 350 of the sending device 300 to implement logic to perform various functions.

In executing the control routine 340 in some embodiments, the processor component 350 organizes the data 331 into one or more packets of data that are stored as part of the packet data 333. The data 331 may include any of a variety of types of data such as human-readable text, executable instructions, photographs, computer-generated graphics, etc. The processor component 350 may also incorporate the metadata 332 into one or more of the packets of data into which the data 331 is organized. The metadata 332, if present, includes information concerning the data 331, such as the size of the data 331 (e.g., how large in bits or bytes), a checksum or other value (e.g., a cyclic redundancy check value) to enable verification of the data 331 being received intact, a file name, file size or other file parameter where the data 331 is maintained as a file in a file system of the sending device 300. The processor component 350 may analyze the data 331 to derive the metadata 332 (e.g., derive a checksum value).

The processor component 350 then encodes the one or more packets of the packet data 333 into data patterns. The data patterns are then merged with alternating ones of two or more marker patterns stored as part of the marker data 335 to create frame patterns that are stored as part of the pattern data 336. The processor component 350 then operates the display 380 to visually present images 880 of the marker patterns, one at a time, at a selected display rate that may be specified by the rate setting 338. The display rate at which frame patterns are visually presented on the display 380 may match a refresh rate at which images are rendered in a raster scan manner onto the display 380, or may be at a rate that is a fraction of that refresh rate.

Figure 3:
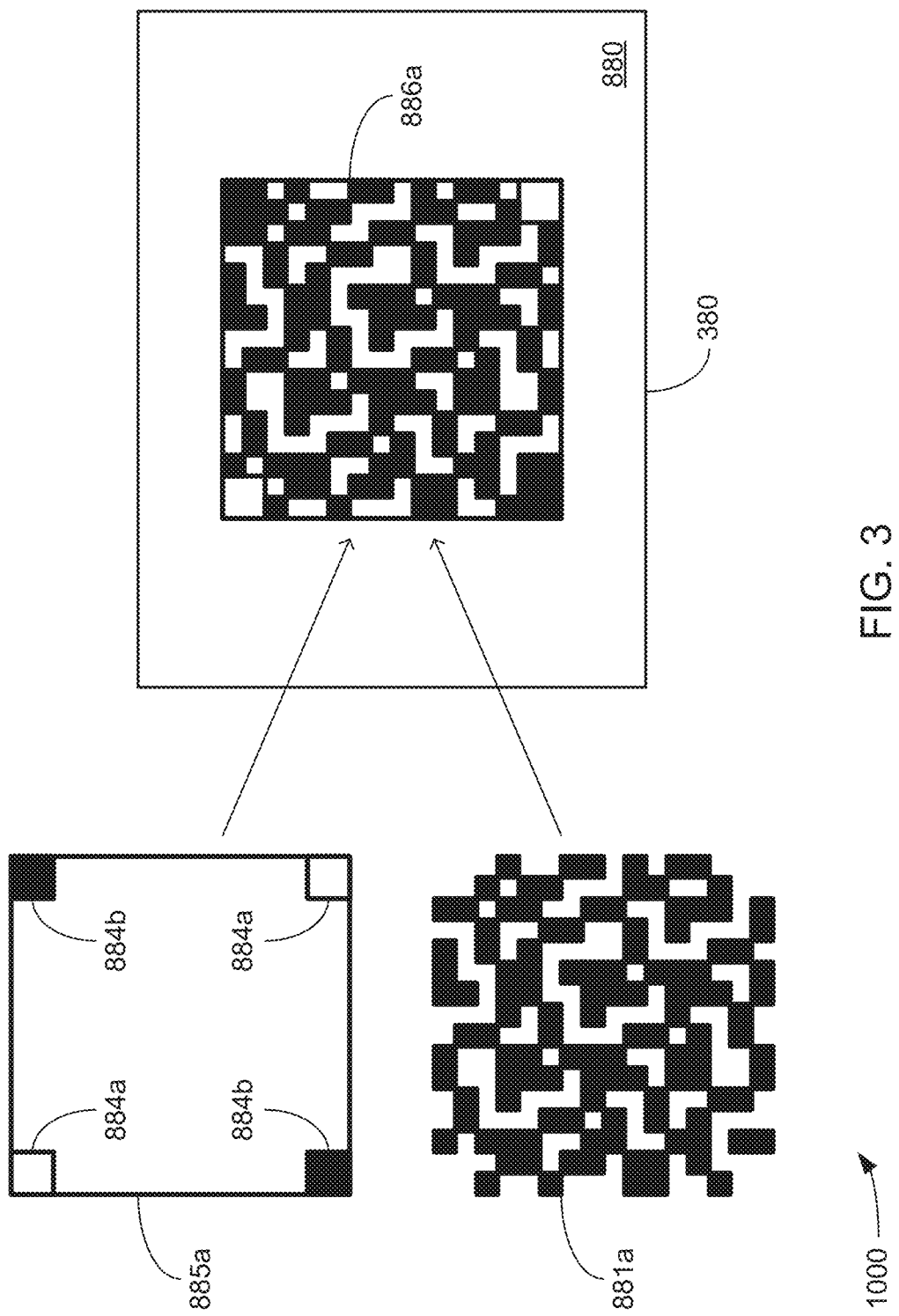
FIG. 3 illustrates an embodiment of a frame pattern.

FIG. 3. illustrates an embodiment of a frame pattern 886a visually presented in an image 880 on the display 380. The majority of the frame pattern 886a is made up of a data pattern 881a into which a packet of data of the data 331 has been encoded, and which may also encode at a least a portion of the metadata 332. Although the data pattern 881a is depicted as made up of many relatively small squares that are either black or white, those familiar with visual encodings of data such as one-dimensional and two-dimensional so-called "barcodes" will readily recognize that numerous other embodiments of data pattern are possible. More specifically, shapes other than squares may be used (e.g., rounded dots, lines, etc.) and/or a range of different sizes may be used. Alternatively or additionally, a range of shades of gray and/or ranges of color may be used, instead of simply black or white.

The frame pattern 886a is also made up of a marker pattern 885a, portions of which are disposed about the periphery of the data pattern 881a. As depicted, the marker pattern 885a incorporates white square markers 884a and black square markers 884b disposed about the vicinity of the corners of the periphery of the generally rectangular shape of the data pattern 881a. Although the marker pattern 885a is depicted as made up of generally rectangular markers disposed at corners, numerous other embodiments of marker pattern are possible. More specifically, a combination of markers in the form of thick and thin lines (or markers of any of a variety of other possible shape) may be disposed along the sides of the periphery of the generally rectangular shape of the data pattern 881a.

Returning to FIG. 1, in various embodiments, the receiving device 500 incorporates one or more of a processor component 550, a storage 560, a camera 570, a display 580 and an interface 590 to couple the receiving device 500 to the network 999b. The storage 560 stores one or more of the data 331, the metadata 332, a packet data 533, pattern data 536, a rate setting 537 and a control routine 540. The control routine 540 may incorporate a sequence of instructions operative on the processor component 550 in its role as a main processor component of the receiving device 500 to implement logic to perform various functions.

In executing the control routine 540, the processor component 550 operates the camera 570 to capture images of the frame patterns visually presented in the images 880 on the display 380, and stores those captured images as part of the pattern data 536. As has been discussed, the camera 570 may be operated to capture those images at a capture rate selected to be at least twice the display rate at which the sending device 300 visually presents frame patterns on the display 380. As has also been discussed, the sending device 300 may provide an indication of its display rate to the receiving device 500, and may do so by incorporating that indication into a portion (e.g., a data pattern) of one or more of the frame patterns visually presented on the display 380.

The processor component 550 then examines the marker patterns of the frame patterns captured in the captured images stored in the pattern data 536 to distinguish useful frame patterns from either unusable or duplicate frame patterns. The processor component 550 then decodes the data patterns of the frame patterns that are determined to be useful frame patterns to retrieve at least the packets of data from each, storing those packets of data as part of the packet data 533. From those packets of data stored in the packet data 533, the processor component 550 retrieves the data 331, and may also retrieve the metadata 332 in embodiments in which the metadata 332 is incorporated into one or more packets of data. In embodiments in which the receiving device incorporates the display 580, the processor component 550 may visually present at least a portion of the data 331 thereon.

Figure 4:
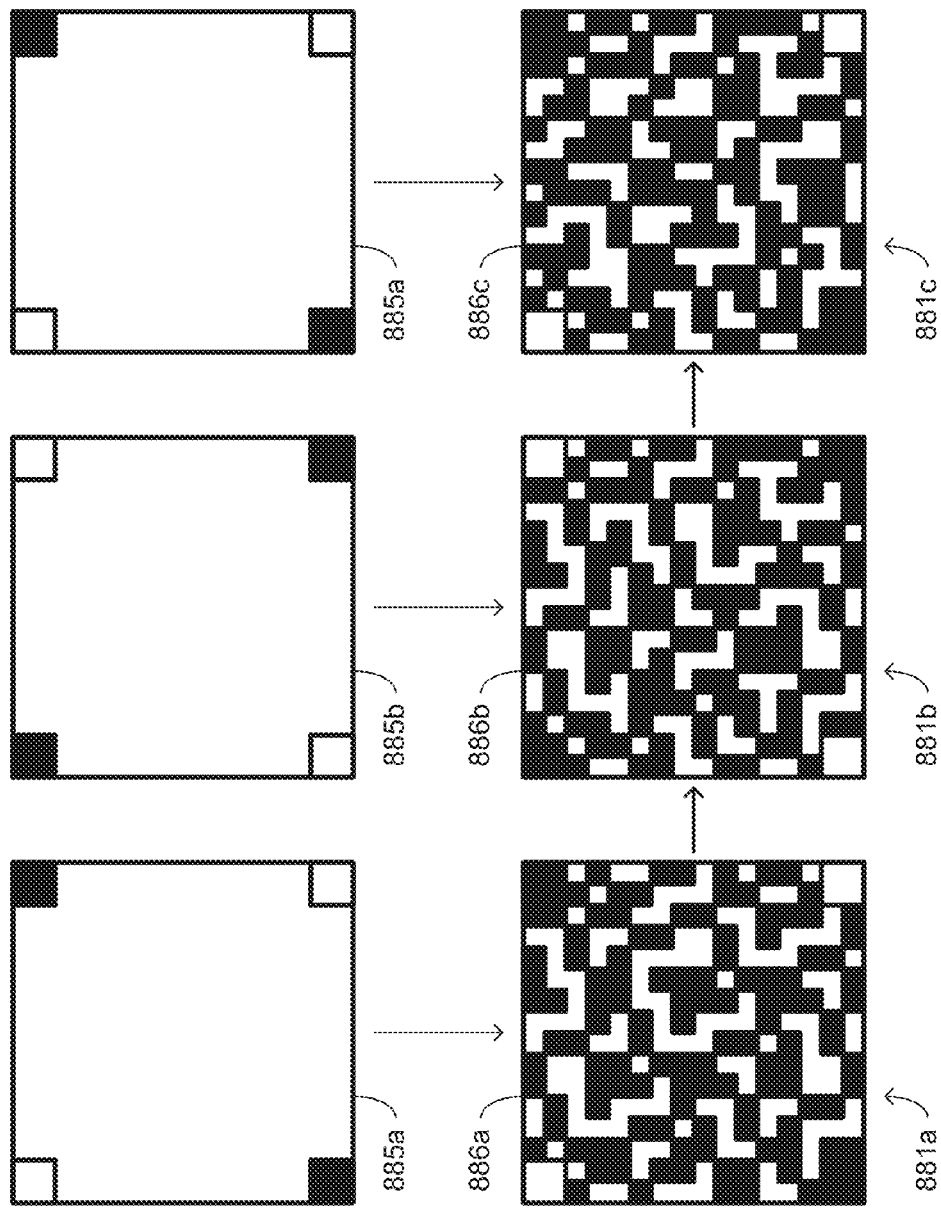
FIG. 4 illustrates an embodiment of a series of frame patterns.

FIG. 4 illustrates an embodiment of a series of frame patterns 886a, 886b and 886c incorporating data patterns 881a, 881b and 881c, respectively, in an order for visual presentation in images 880 on the display 380. As depicted, the frame patterns 886a-c incorporate alternating ones of the marker pattern 885a and another marker pattern 885b. As also depicted, the marker patterns 885a and 885b are mirror images of each other, one having its markers 884a-b disposed in mirror opposite positions relative to the other. More specifically, each of the frame patterns 886a and 886c incorporate the marker pattern 885a, and the frame pattern 886b incorporates the marker pattern 885b. This alternating among the marker patterns 885a and 885b enables the receiving device to relatively easily determine when one frame pattern visually presented on the display 380 has been fully replaced with the next frame pattern in a series of marker patterns.

For example, following visual presentation of the frame pattern 886a including the marker pattern 885a on the display 380, the processor component 350 of the sending device 300 replaces the frame pattern 886a on the display 380 with the frame pattern 886b including the marker pattern 885b. The resulting transition from the marker pattern 885a to the marker pattern 885b enables the processor component 550 of the receiving device 500 to quickly determine that a change in frame patterns has occurred from one of the captured images stored in the pattern data 536 to another. More specifically, if the processor component 550 examines the marker patterns of two adjacent captured images and determines that the same marker pattern (e.g., the marker pattern 885a) appears in both, then, the processor component 550 may determine that the frame patterns captured in both images are the same frame pattern, and therefore, one of those two frame patterns is a duplicate frame pattern. Alternatively, if the processor component 550 examines the marker patterns of two adjacent captured images and determines that different marker patterns appear in each (e.g., one has the marker pattern 885a and the other has the marker pattern 885b), then the processor component may determine that the frame patterns captured in those two images are different frame patterns in a series of frame patterns (e.g., the series of frame patterns depicted in FIG. 4), one following the other.

It should be noted that despite the depiction of a pair of mirror image marker patterns 885a and 885b used to enable relatively simple detection of instances of changes between frame patterns, other embodiments with different combinations of marker frames are possible. By way of example, some embodiments may employ more than two marker frames. Alternatively or additionally, whatever number of marker frames are employed may differ from each other in some other manner than being mirror images of each other.

Figure 5B:
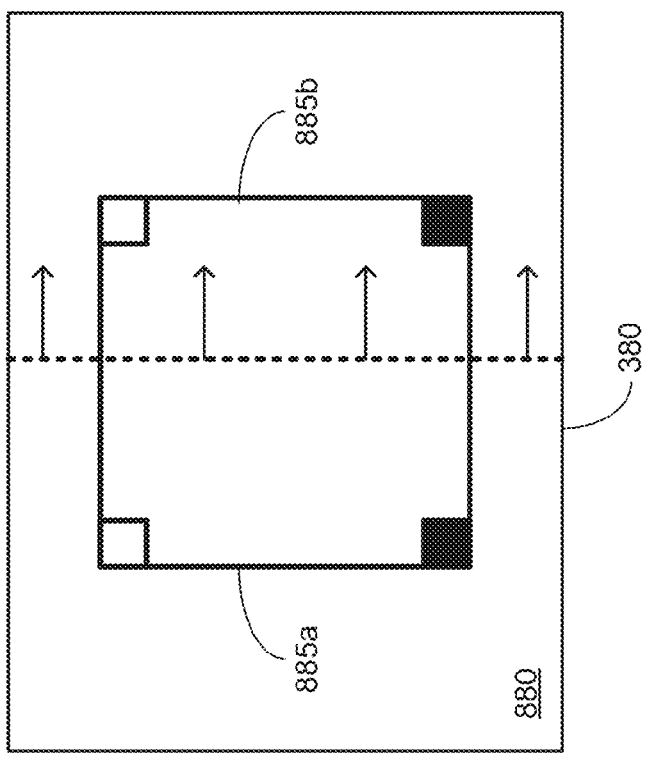
FIGS. 5a and 5b illustrate examples of raster scan rendering of a frame pattern onto a display.
Figure 5A:
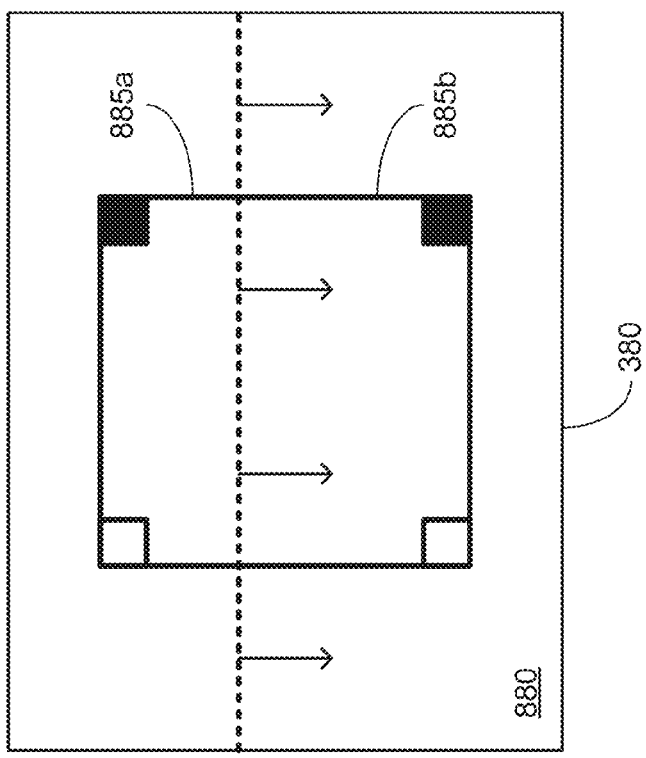

FIGS. 5a and 5b illustrate examples of captured images of unusable frames and how unusable frames may be identified by marker patterns. Also depicted are two examples of proliferating differences in the raster scanning order in which the same image 880 may be rendered onto the display 380 in different embodiments. In FIG. 5a, the lines of pixels of the image 880 that are raster scan rendered onto the display 380

(one of those lines being depicted with a dotted line) extend lengthwise along the length of the viewable area of the display 380, and those lines are scanned onto the display 380 line-by-line proceeding crosswise from one of the longer edges of the display 380 to the other. In contrast, FIG. 5b depicts the lines of pixels of the same image 880 that are raster scan rendered onto the display 380 (one of those lines being depicted with a dotted line) as extending crosswise (e.g., perpendicularly to the length of the viewable area of the display 380), and those lines are scanned onto the display 380 line-by-line proceeding lengthwise from one of the shorter edges of the display 380 to the other.

Given that the camera 570 is apt to be operated to capture images of what is visually presented on the display 380 with a capture rate considerably higher than the display rate at which frame patterns are visually presented on the display 380, it is likely that a significant proportion of the captured images will be of a new frame pattern only partly rendered onto the display 380 with its preceding frame pattern still partly visible. Stated differently, it is envisioned that a significant number of the captured images will be of a mixture of portions of two frame patterns visually presented on the display 380 at the time of image capture. Such a mixture results in what superficially appears to be a single frame pattern, but this apparent frame pattern is unusable as it is likely prohibitively difficult to determine where the data pattern of one of the frame patterns ends and the data pattern of the other of the frame patterns begins. Also, any checksum or other error correction metadata incorporated into the data pattern of one or the other of the two mixed frame patterns will likely be of no use as such metadata will have been intended to be applied to a single complete data pattern, and not to a mixture of portions of two data patterns. Further, presuming that the capture rate is at least twice the display rate, there should be other captured images within the pattern data 536 that show complete ones of the two mixed frame patterns such that there is no need to attempt to decode or otherwise make use of such a mixture of two frame patterns.

Due to the alternating use of the two marker patterns 885a and 885b, the processor component 550 of the receiving device 500 is able to relatively quickly determine whether a captured image stored within the pattern data 536 is of a single complete frame pattern or is an unusable frame pattern made up of portions of two frame patterns. As depicted, due to the mirror image positions of the markers 884a and 884b between the two marker patterns 885a and 885b, the processor component 550 is able to use the placement of two of the markers 884a on adjacent corners and/or two of the markers 884b also on adjacent corners as an indication that the frame pattern captured in a captured image is one of such unusable frame patterns. As can be seen in FIG. 4, a usable frame pattern would have the markers 884a on diagonally opposite corners and the markers 884b on the other diagonally opposite corners.

Figure 6:
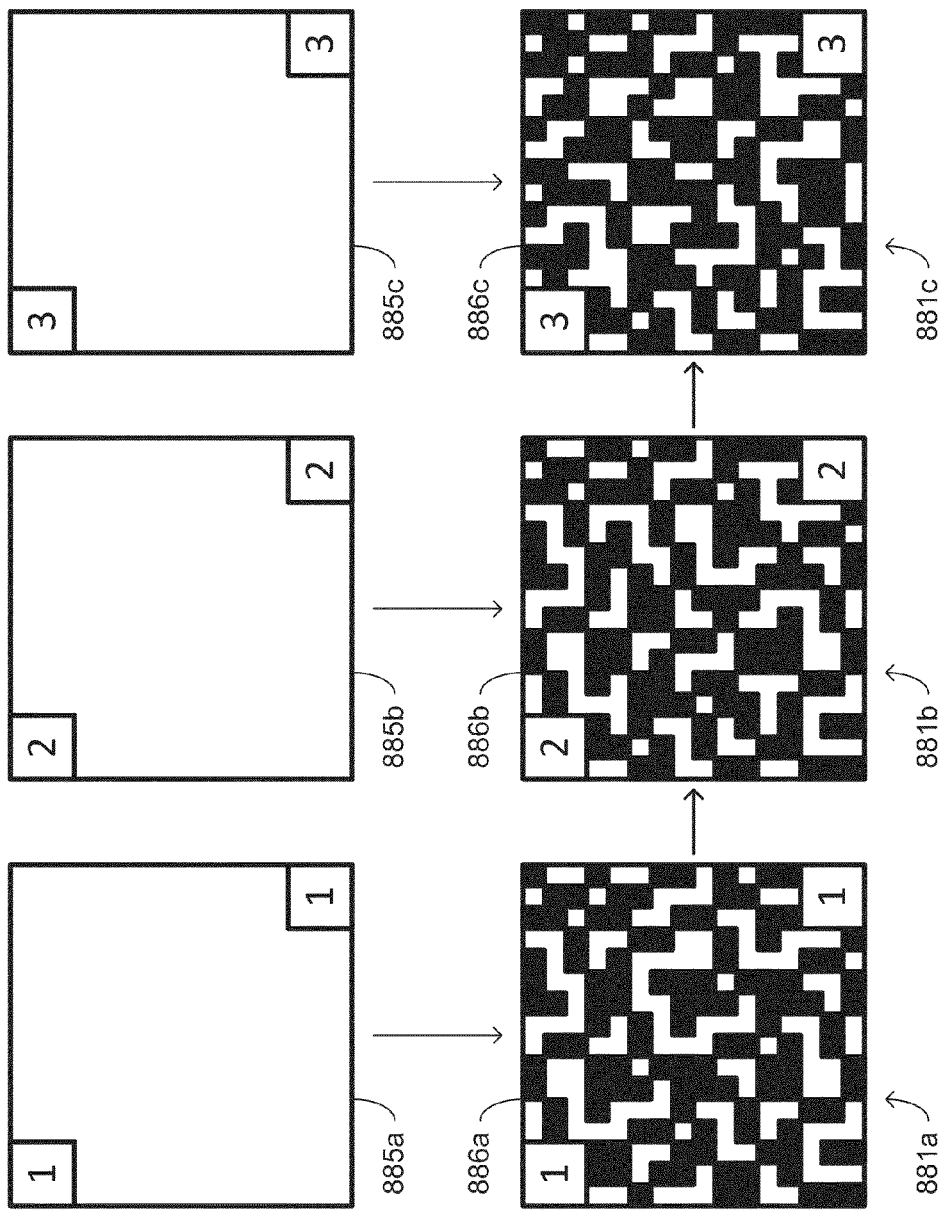
FIG. 6 illustrates an alternate embodiment of a series of frame patterns.

FIG. 6 illustrates an alternate embodiment of a series of the frame patterns 886a-c illustrated in FIG. 4. The alternate embodiment of the series of frame patterns 886a-c of FIG. 6 is similar to the embodiment of FIG. 4 in many ways, and thus, like reference numerals are used to refer to like elements throughout. However, each of the frame patterns 886a-c of FIG. 6 replace the four white and black square markers 884a and 884b, respectively, of each of the frame patterns 886a-c of FIG. 4 with a pair of labeled markers. As depicted in FIG. 6, the labeling of each marker of the pair of markers in each of the frame patterns 886a-c is sequentially numbered. However, still other text or non-text labeling may be employed in still other embodiments. The use of sequential numbering (which may roll over at a selected value) may be selected to provide a mechanism to relatively simply determine when a previous frame pattern has been replaced on the display 380 with a new one. Further, such labeling may be selected to provide a mechanism to relatively simply determine when a captured image includes an unusable frame pattern that is actually made up of portions of two frame patterns. For such unusable frame patterns, the two text or non-text labels will not match.

Returning again to FIG. 1, the processor component 550 may be caused by execution of the control routine 540 to further reduce electric power consumption by attempting to synchronize the analysis of marker patterns in each captured image with the display rate at which the sending device 300 visually presents each frame pattern. Stated differently, the processor component 550 may be caused to determine the rate at which captured images stored in the pattern data 536 are determined to include useful frame patterns having data patterns that are to be decoded.

By way of example, where the capture rate is exactly twice the display rate such that every other captured image of the pattern data 536 includes a useful frame pattern, the processor component 550 may determine that the marker pattern of only every other captured image should be analyzed to confirm that the frame pattern thereof is a useful frame pattern, instead of wasting electrical energy examining the marker pattern of the frame pattern of every captured image. However, even in embodiments in which the processor components 350 and 550 attempt to synchronize the display and capture rates, some degree of error in timing between the two can accumulate over time. As a result, instances in which two adjacent captured images include useful frame patterns and/or instances in which there is one more additional captured image than expected that includes a frame pattern that is not a useful frame pattern (e.g., is a duplicate frame pattern or an unusable frame pattern).

In response to such instances, the processor component 550 may momentarily return to analyzing the marker patterns of the frame patterns of each captured image without skipping captured images until a new determination is made of a rate at which captured images are determined to have frame patterns that are useful frame patterns. By way of example, upon encountering a captured frame that was expected to have a useful frame pattern, but is determined not to, the processor component 550 may analyze the marker pattern of one or both of frame patterns in one or both of the adjacent captured images. In this way, the processor component 550 may attempt to find the next useful frame, and then examine the marker pattern in the frame pattern in each successive captured image until such a new determination can be made.

Figure 2:
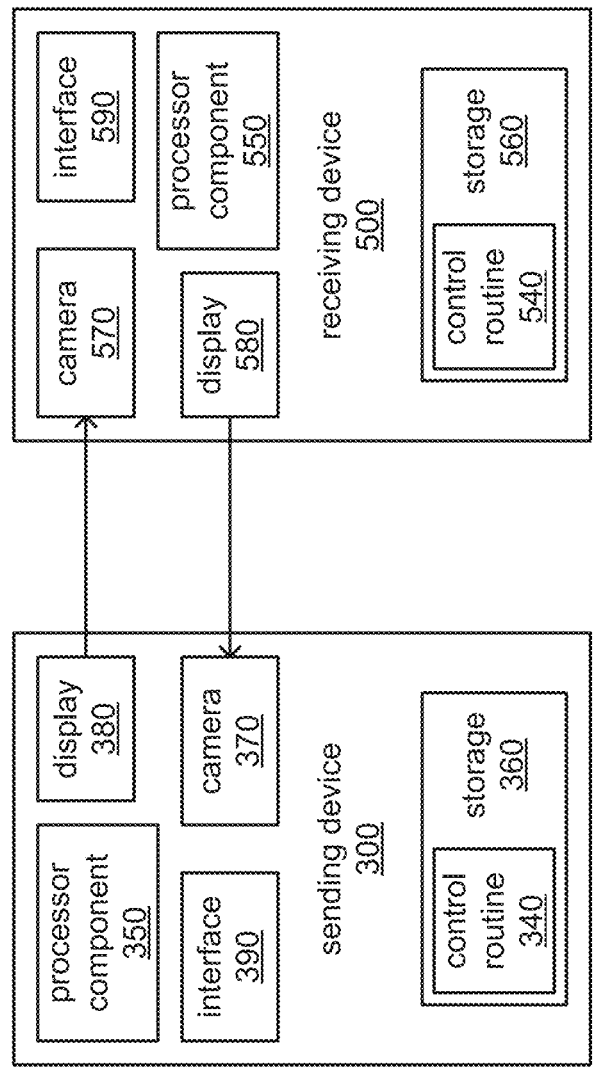
FIG. 2 illustrates an alternate embodiment of a VLC system.

FIG. 2 illustrates a block diagram of an alternate embodiment of the VLC system 1000 in which two-way visual light communications occur between the sending device 300 and the receiving device 500, thus making each of these two computing devices into both a sending device and a receiving device. The alternate embodiment of the VLC system 1000 of FIG. 2 is similar to the embodiment of FIG. 1 in many ways, and thus, like reference numerals are used to refer to like elements throughout. However, unlike the VLC system 1000 of FIG. 1 in which the sending device 300 did not require a camera and the receiving device 500 did not require a display, the occurrence of two-way VLC between these two computing devices 300 and 500 requires that the sending device 300 incorporate a camera 370 and the receiving device 500 incorporate the display 580. In such two-way VLC, the camera 370 recurringly captures images of frame patterns visually presented on the display 580 and the camera 570 recurringly captures images of frame patterns visually presented on the display 380. Both of these computing devices 300 and 500 may seeks to conserve electric power by first analyzing marker patterns of the frame patterns they capture before selectively analyzing data patterns as has been described.

In various embodiments, each of the processor components 350 and 550 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, each of the storages 360 and 560 may be based on any of a wide variety of information storage technologies. Those technologies may include volatile technologies requiring the uninterrupted provision of electric power and/or may include technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these may include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 390 and 590 may employ any of a wide variety of signaling technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 7:
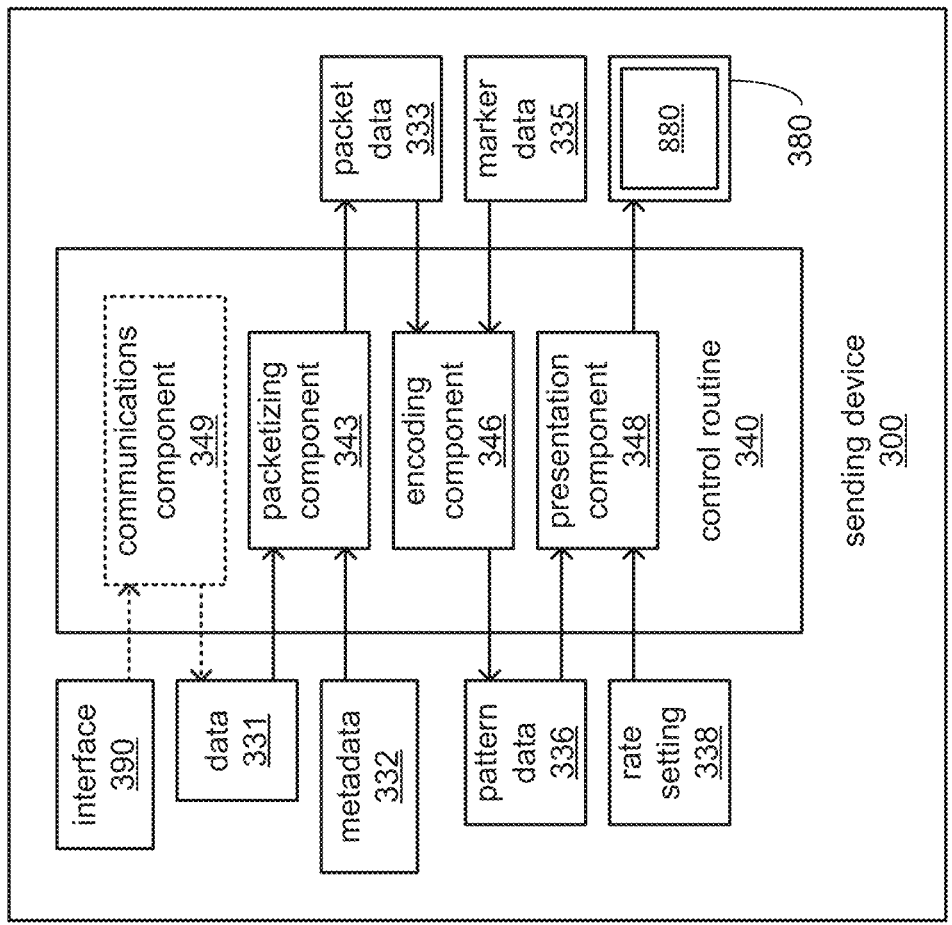
FIGS. 7-8 each illustrate a portion of an embodiment.
Figure 8:
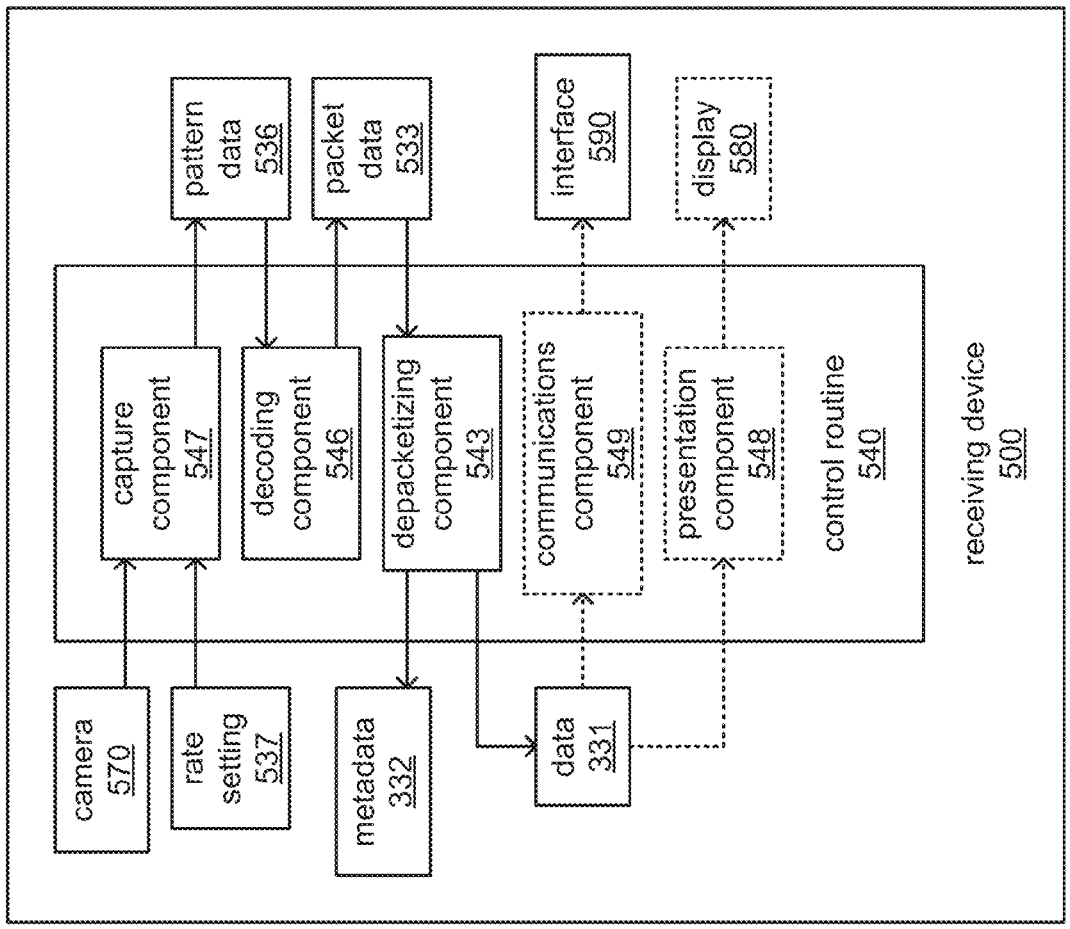

FIGS. 7 and 8 each illustrate a block diagram of a portion of an embodiment of the VLC system 1000 of FIG. 1 in greater detail. More specifically, FIG. 7 depicts aspects of the operating environment of the sending device 300 in which the processor component 350, in executing the control routine 340, transmits data via VLC by encoding data into data patterns within frame patterns and visually presenting the frame patterns on the display 380. FIG. 8 depicts aspects of the operating environment of the receiving device 500 in which the processor component 550, in executing the control routine 540, receives the data by capturing images of the frame patterns using the camera 570 and selectively decoding the data patterns of the frame patterns based on the marker patterns thereof. As recognizable to those skilled in the art, the control routines 340 and 540, including the components of which each is composed, are selected to be operative on whatever type of processor or processors that are selected to implement applicable ones of the processor components 350 and 550.

In various embodiments, each of the control routines 340 and 540 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 350 or 550. Where one or more device drivers are included, those device drivers may provide support for any of a variety of other components, whether hardware or software components, of corresponding ones of the computing devices 300 or 500.

The control routines 340 or 540 may include a communications component 349 or 549, respectively, executable by whatever corresponding ones of the processor components 350 or 550 to operate corresponding ones of the interfaces 390 or 590 to transmit and receive signals via the networks 999a or 999b as has been described. Among the signals exchanged may be signals conveying the data 130 among one or more of the computing devices 100, 300, 500 or 700. As will be recognized by those skilled in the art, each of these communications components is selected to be operable with whatever type of interface technology is selected to implement corresponding ones of the interfaces 390 or 590.

Turning more specifically to FIG. 7, the control routine 340 includes a packetizing component 343 executable by the processor component 350 to organize at least the data 331 into one or more packets of data stored within the packet data 333. The packetizing component 343 may also incorporate the metadata 332 into the one or more packets of data associated with the data 331. Again, the data 331 may include any of a variety of types of data such as human-readable text, executable instructions, photographs, computer-generated graphics, etc. Also, the metadata 332 (if present) may include indications of the size or type of data included in the data 331, indications of file size or name where the data 331 is organized into a file in a file system of the sending device 300, and/or a checksum, cyclic redundancy check (CRC) or other mechanism to check of whether the data 331 is received intact. In some embodiments, the packetizing component 343 may derive the metadata 332 from the data 331 (e.g., where the metadata 332 includes a checksum, cyclic redundancy check, or other value to verify the integrity of the data 331).

The control routine 340 includes an encoding component 346 executable by the processor component 350 to encoding the packets of data of the packet data 333 into data patterns (e.g., the data patterns 881a-c), and to combine those data patterns with marker patterns (e.g., the marker patterns 885a-b or 885a-c) of the marker data 335 to generate frame patterns (e.g., the frame patterns 886a-c). The generated frame patterns are stored as part of the pattern data 336. Again, although data patterns made up of relatively small white and black squares have been depicted, other embodiments of data patterns employing different shapes and/or shading are possible. Also, although marker patterns having black and white square markers disposed about the periphery of the data patterns at corners have been depicted, other embodiments of marker patterns incorporating markers of an entirely different configuration and/or positioned about edges of the periphery of data patterns are possible.

The control routine 340 includes a presentation component 348 executable by the processor component 350 to visually present the frame patterns of the pattern data 336 in images 880 on the display 380 at a display rate that may be indicated in the rate setting 338. As has been discussed, the display rate at which frame patterns are visually presented on the display 380 may be the refresh rate for the raster scan rendering of the images 880 onto the display 380 such that a new frame pattern is visually presented on the display 380 with each refresh in some embodiments. Alternatively, in other embodiments, the display rate may be a fraction of the refresh rate of the display 380 such that each frame pattern is visually presented on the display 380 through two or more refreshes of the display 380 such that a new frame pattern is rendered onto the display 380 every two or more refreshes. As has also been discussed, an indication of the display rate may be embedded into one or more of the frame patterns for transmission to the receiving device 500 to enable the receiving device 500 to select a capture rate based on an indication of the display rate.

Turning more specifically to FIG. 8, the control routine 540 includes a capture component 547 executable by the processor component 550 to capture images that include the images 880 visually presented on the display 380, including images of frame patterns. The capture component 547 does so at a selected capture rate that may be specified by the rate setting 537 or that may be derived by the capture component 547 from an indication of a display rate received from the sending device 300. The capture component 547 stores the captured images as part of the pattern data 536. Again, the capture rate may be at least twice the display rate at which the frame patterns are visually presented on the display 380 in accordance with the Nyquist-Shannon sampling theory.

The control routine 540 includes a decoding component 546 executable by the processor component 550 to analyze the marker patterns of the frame patterns captured in the captured images of the pattern data 536, and to selectively decode the data patterns of those frame patterns to retrieve packets of data based on indications from the analysis of the marker patterns of which frame patterns in the captured images are useful frame patterns. Again, the useful frame patterns are frame patterns that are not a mixture of a portion of a new frame pattern in the process of being rendered onto the display 380 and a portion of a previous frame pattern still visually presented on the display 380 (e.g., unusable frame patterns). Also, the useful frame patterns are not duplicates of frame patterns in the captured images. The retrieved packets of data are stored as part of the packet data 533.

In some embodiments, the decoding component 546 may attempt to synchronize the analysis of marker patterns to the display rate by determining the rate at which frame patterns captured in the captured images are determined to be useful frame patterns, predicting which captured images are likely to include useful frame patterns based on that rate, and analyzing the marker patterns of only those images to determine which include useful frame patterns. As has been discussed, by predicting which captured images have useful frame patterns and not analyzing marker patterns in the captured images that are predicted to not have useful frame patterns, an additional reduction in the consumption of electric power may be realized by not analyzing the marker patterns of every captured image.

In such embodiments, as a captured image is confirmed by analysis of the marker pattern therein to have a useful frame pattern, all preceding captured images may be deleted or otherwise removed from the pattern data 536 by some other mechanism of the decoding component 546. However, where a captured image that was predicted by the decoding pattern 546 to have a useful frame pattern is found to not have a useful frame pattern, then the decoding component 546 may analyze the marker patterns in the frame patterns of one or both of the adjacent captured images (e.g., one or both of the immediately preceding and immediately following captured images) to locate a captured image that includes a useful frame pattern that immediately follows that last known useful frame pattern. Further, the decoding component 546 may return to analyzing marker patterns of the frame patterns of every captured image until a new and consistent rate with which captured images are determined by the decoding component 546 to include useful frame patterns is observed.

The control routine 540 includes a depacketizing component 543 executable by the processor component 550 to retrieve the data 331 from the one or more packets of data into which the data 331 was organized by the sending device 300. The depacketizing component 543 may also retrieve the metadata 332 from the one or more packets associated with the data 331, and may employ the metadata 332 in the retrieval of the data 331 (e.g., checking the integrity of the data 331 as now retrieved from the one or more packets).

The control routine 540 may include a presentation component 548 executable by the processor component 550 to visually present the data 331 on the display 548 (if present) following its retrieval from the one or more packets of data received via VLC. As also previously discussed, the display 580 may alternatively or additionally be employed in enabling two-way visual light communications between the sending device 300 and the receiving device 500.

Figure 9:
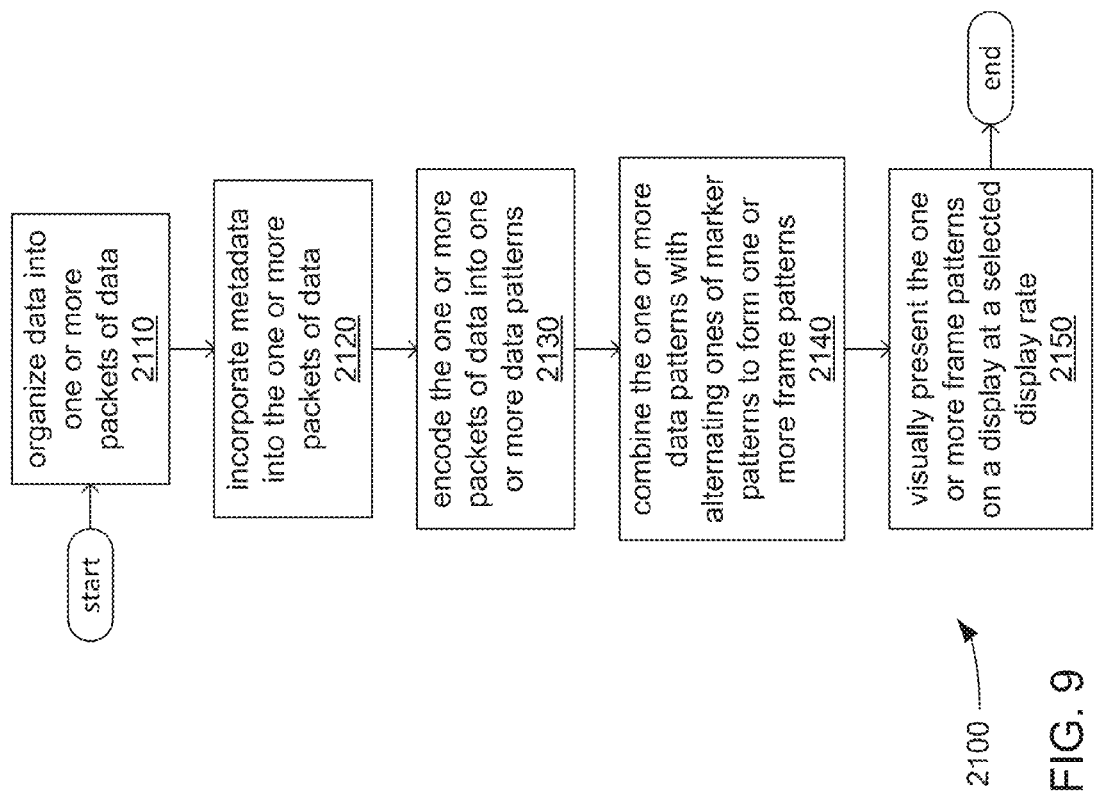
FIGS. 9-11 each illustrate a logic flow according to an embodiment.

FIG. 9 illustrates one embodiment of a logic flow 2100. The logic flow 2100 may be representative of some or all of the operations executed by one or more embodiments described herein. More specifically, the logic flow 2100 may illustrate operations performed by the processor component 350 in executing at least the control routine 340, and/or performed by other component(s) of the sending device 300.

At 2110, a processor component of a sending device (e.g., the processor component 350 of the sending device 300) organizes data (e.g., the data 331) into one or more packets of data. As previously discussed, metadata may be associated with or derived from the data 331, and may include information concerning characteristics of the data itself, or information useful in checking the integrity of the data upon being received by another computing device. That metadata may be incorporated into the one or more packets of data at 2120.

At 2130, the one or more packets are encoded into one or more data patterns. Each of the one or more data patterns are then combined with an alternating one of two or more marker patterns to form one or more frame patterns at 2140. As previously discussed, two or more marker patterns are employed in an alternating manner to enable a receiving device (e.g., the receiving device 500) to analyze just the marker patterns to determine when one frame pattern has ceased to be visually presented as part of a sending device transmitting it, and a new frame pattern is now visually presented. As also previously discussed, two or more marker patterns are employed to enable the receiving device to analyze just the marker patterns to determine when an apparent frame pattern is actually an unusable frame pattern made up of portions of two frame patterns as a result of an image capture when only a portion of one of the frame patterns has been raster scan rendered onto a display such that a portion of the other frame pattern is still visually presented on that display.

At 2150, the frame patterns are visually presented on a display of the sending device (e.g., the display 380) at a selected display rate. As previously discussed, the display rate may be the refresh rate of the display or a fraction thereof.

Figure 10:
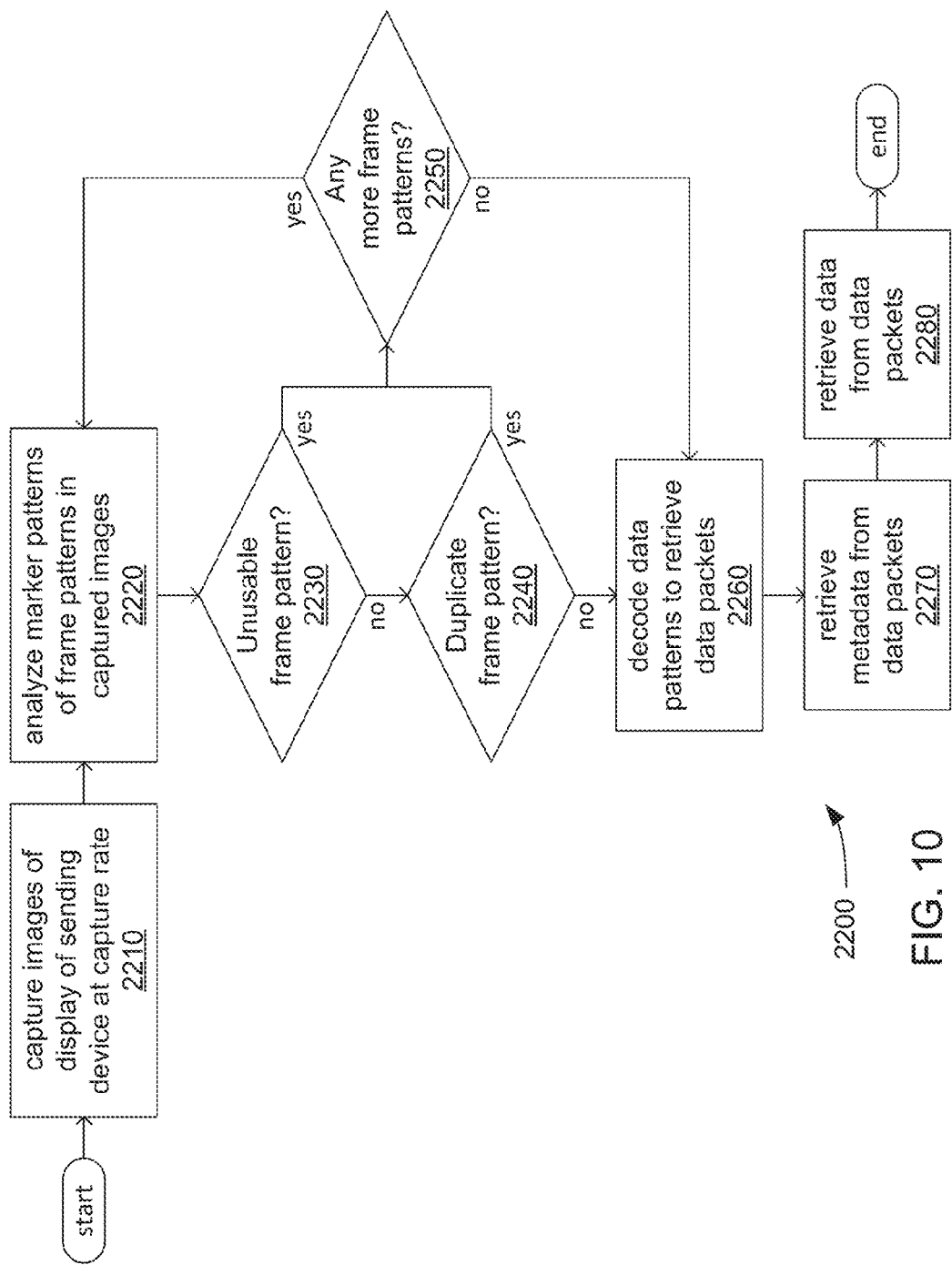

FIG. 10 illustrates one embodiment of a logic flow 2200. The logic flow 2200 may be representative of some or all of the operations executed by one or more embodiments described herein. More specifically, the logic flow 2200 may illustrate operations performed by the processor component 550 in executing at least the control routine 540, and/or performed by other component(s) of the receiving device 500.

At 2210, a processor component of a receiving device (e.g., the processor component 550 of the receiving device 500) captures images of a display of a sending device (e.g., the display 380 of the sending device 300) at a selected capture rate. As previously discussed, the capture rate may be selected to be at least twice the display rate at which the sending device visually presents frame patterns and/or may be derived by the processor component of the receiving device from an indication of a display rate received from the sending device.

At 2220, the marker patterns of frame patterns in the captured images are analyzed to identify useful frame patterns. If the marker pattern of a frame pattern is determined to indicate that the frame pattern is unusable at 2230, then a check is made at 2250 as to whether there are any more frame patterns. However, if the marker pattern of the frame pattern is not determined to indicate that the frame pattern is unusable at 2230, then a check is made at 2240 as to whether the marker pattern indicates that the frame pattern is a duplicate. If the frame pattern is determined to be a duplicate, then the check at 2250 is made as to whether there are any more frame patterns. At 2250, if there are more frame patterns in the captured images for which analysis of their marker patterns is to be done, then those marker patterns are analyzed at 2220.

However, if either the marker pattern is not determined to indicate that the frame pattern is not a duplicate at 2240 or there are no more frame patterns for which analysis of their marker patterns is to be done at 2250, then the data patterns of frame patterns that are determined to be useful frame patterns are decoded at 2260 to retrieve packets of data. Any metadata incorporated into those packets of data is retrieved from those packets at 2270, and data is retrieved from those packets at 2280. As previously discussed, the packets of data from which the data patterns were originally generated may include metadata concerning various characteristics of the data within those packets in addition to the data.

Figure 11:
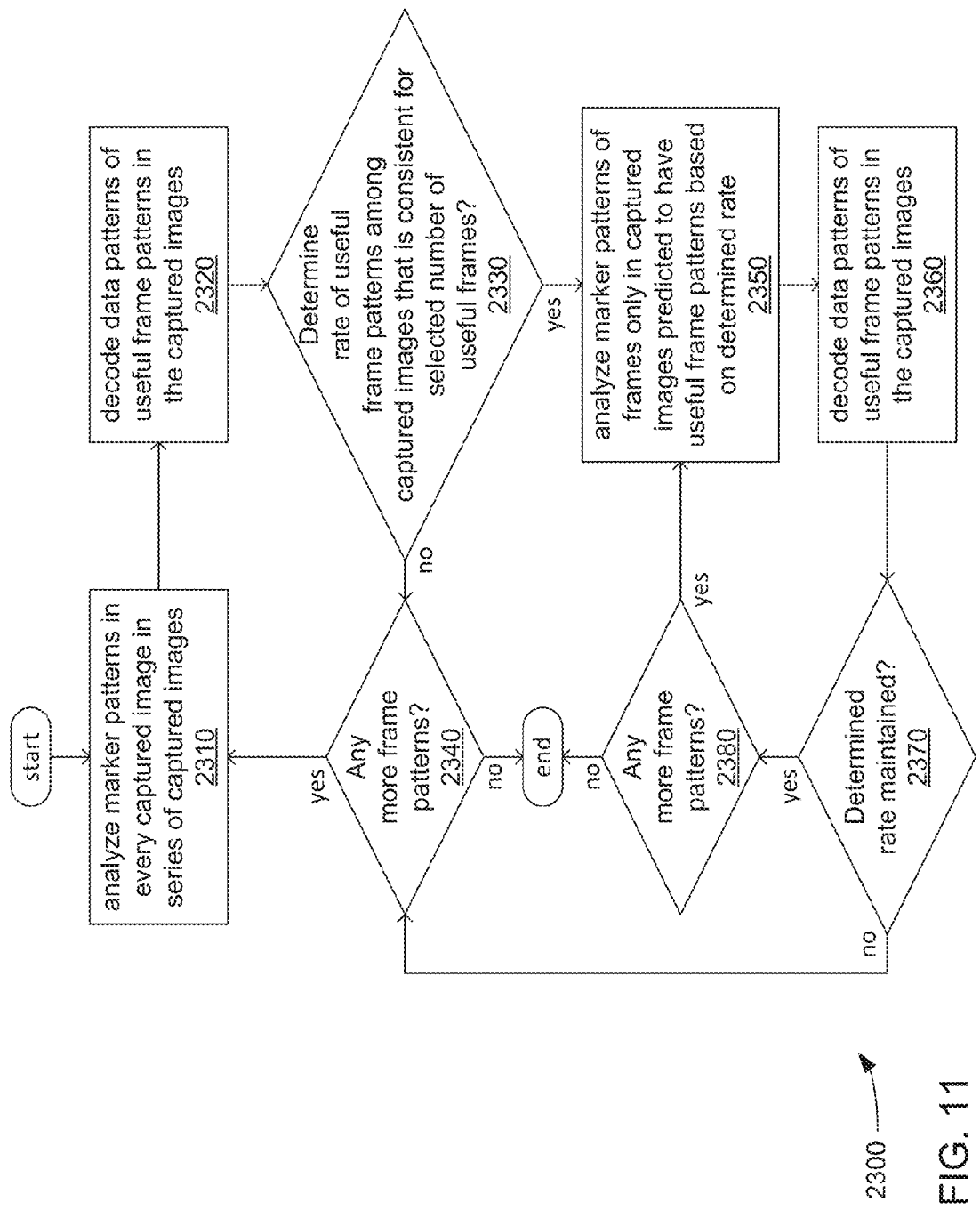

FIG. 11 illustrates one embodiment of a logic flow 2300. The logic flow 2300 may be representative of some or all of the operations executed by one or more embodiments described herein. More specifically, the logic flow 2300 may illustrate operations performed by the processor component 550 in executing at least the control routine 540, and/or performed by other component(s) of the receiving device 500.

At 2310, a processor component of a receiving device (e.g., the processor component 550 of the display device 500) analyzes the marker patterns of frame patterns in every captured image in a series of captured images. As previously discussed, the captured images are of a display of a sending device (e.g., the display 380 of the sending device 300) on which the frame patterns are visually presented. As also discussed, the capturing of the captured images may have occurred at a capture rate derived by the processor component of the receiving device from an indication of a display rate provided by the sending device. At 2320, the data patterns of the frame patterns determined to be useful are decoded to retrieve packets of data.

At 2330, a check is made as to whether there is a rate at which frame patterns are determined by the analysis of their marker patterns to be useful frame patterns that has been determined to remain consistent for a selected number of useful frames. If such an observation of there being such a consistent rate has not been made, then a check of whether there are more frame patterns is made at 2340. If there are more frame patterns at 2340, then analysis of the marker patterns of the frame pattern of each captured image in the series continues at 2310.

However, if such a determination of there being such a consistent rate is made at 2330, then a change is made towards analyzing the marker patterns only of frame patterns in captured images that are predicted to have useful frame patterns based on that observed rate at 2350. At 2360, the data patterns of the frame patterns confirmed to be useful are decoded to retrieve packets of data.

At 2370, a check is made as to whether that rate has remained consistent such that the captured images predicted to have useful frames have consistently been determined to have useful frames. If such consistency has been maintained, then a check is made at 2380 of whether there are more frame patterns in captured images predicted to have useful frame patterns. If there are more of such frame patterns at 2380, then analysis of the marker patterns of frame patterns in captured images predicted to have useful frame patterns continues at 2350.

However, if such consistency has not been maintained, then a check is made at 2340 as to whether there are more frame patterns in any remaining captured images. If there are more frame patterns at 2340, then a change is made back towards analyzing the marking patterns in each frame pattern at 2310.

Figure 12:
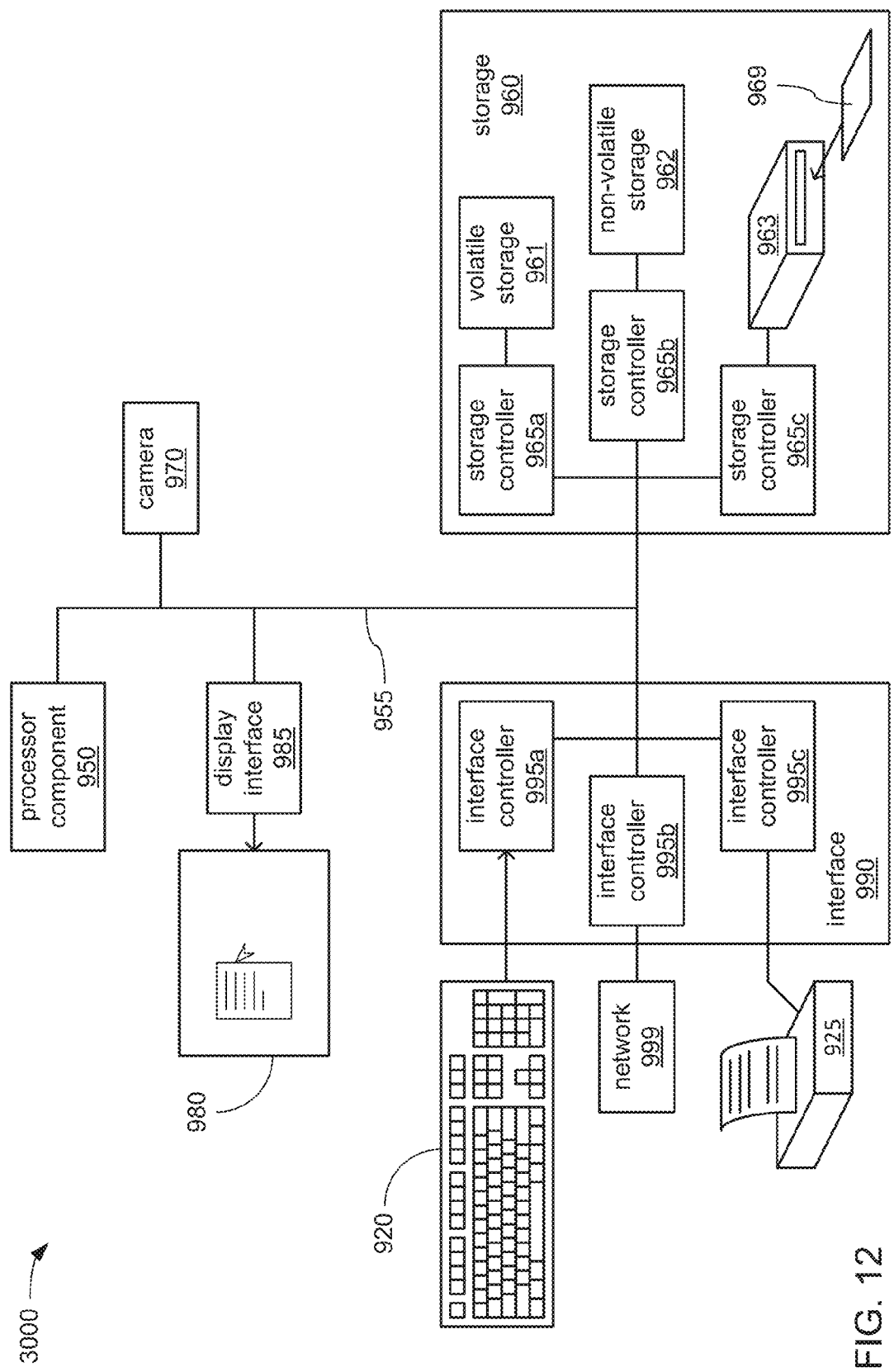
FIG. 12 illustrates a processing architecture according to an embodiment.

FIG. 12 illustrates an embodiment of an exemplary processing architecture 3000 suitable for implementing various embodiments as previously described. More specifically, the processing architecture 3000 (or variants thereof) may be implemented as part of one or more of the computing devices 300 or 500. It should be noted that components of the processing architecture 3000 are given reference numbers in which the last two digits correspond to the last two digits of reference numbers of at least some of the components earlier depicted and described as part of the computing devices 300 and 500. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 includes one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350 and 550) may include any of a wide variety of commercially available processors, employing any of a wide variety of technologies and implemented with one or more cores physically combined in any of a number of ways.

As previously discussed, the storage 960 (corresponding to the storages 360 and 560) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as such that it may include multiple distinct types of storage is in recognition of the commonplace use of more than one type of storage device in computing devices in which one type provides relatively rapid reading and writing capabilities enabling more rapid manipulation of data by the processor component 950 (but using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (corresponding to the interfaces 390 or 590) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, through a network (e.g., the network 999) or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

Further, a computing device implementing the processing architecture 3000 may also incorporate one or more of a camera 970 to capture images of scenery within its field of view. The camera 970 may be based on any of a wide variety of technologies, including semiconductor technologies implementing a multidimensional array of light sensitive elements operated in cooperation to provide a raster-scanned captured image.

Figure 13:
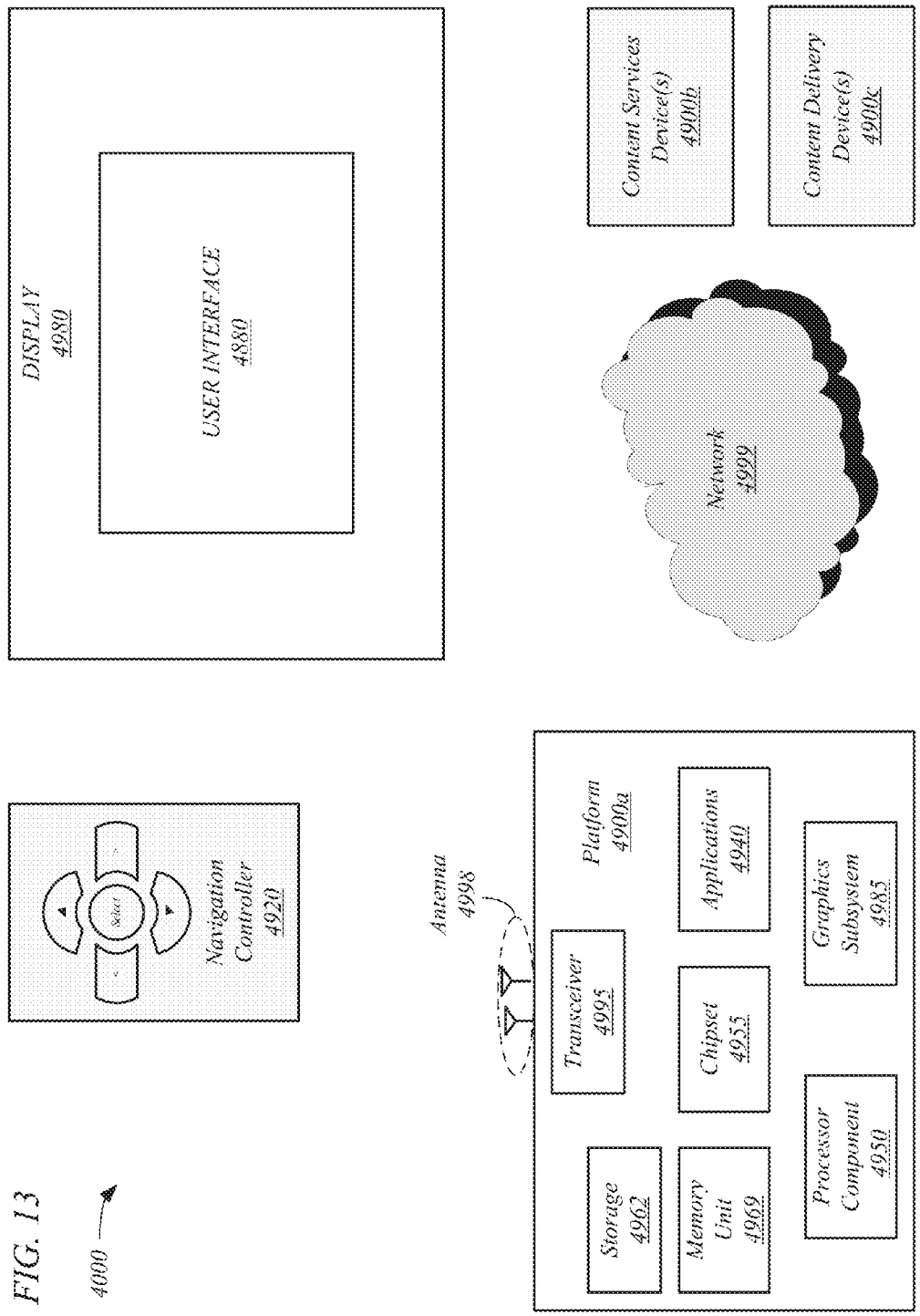
FIG. 13 illustrates another alternate embodiment of a graphics processing system.

FIG. 13 illustrates an embodiment of a system 4000. In various embodiments, system 4000 may be representative of a system or architecture suitable for use with one or more embodiments described herein, such as the VLC system 1000; one or more of the computing devices 300 or 500; and/or one or both of the logic flows 2100-2300. The embodiments are not limited in this respect.

As shown, system 4000 may include multiple elements. One or more elements may be implemented using one or more circuits, components, registers, processors, software subroutines, modules, or any combination thereof, as desired for a given set of design or performance constraints. Although FIG. 13 shows a limited number of elements in a certain topology by way of example, it can be appreciated that more or less elements in any suitable topology may be used in system 4000 as desired for a given implementation. The embodiments are not limited in this context.

In embodiments, system 4000 may be a media system although system 4000 is not limited to this context. For example, system 4000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 4000 includes a platform 4900a coupled to a display 4980. Platform 4900a may receive content from a content device such as content services device(s) 4900c or content delivery device(s) 4900d or other similar content sources. A navigation controller 4920 including one or more navigation features may be used to interact with, for example, platform 4900a and/or display 4980. Each of these components is described in more detail below.

In embodiments, platform 4900a may include any combination of a processor component 4950, chipset 4955, memory unit 4969, transceiver 4995, storage 4962, applications 4940, and/or graphics subsystem 4985. Chipset 4955 may provide intercommunication among processor circuit 4950, memory unit 4969, transceiver 4995, storage 4962, applications 4940, and/or graphics subsystem 4985. For example, chipset 4955 may include a storage adapter (not depicted) capable of providing intercommunication with storage 4962.

Processor component 4950 may be implemented using any processor or logic device, and may be the same as or similar to the processor component 950 of FIG. 12.

Memory unit 4969 may be implemented using any machine-readable or computer-readable media capable of storing data, and may be the same as or similar to storage media 969 of FIG. 12.

Transceiver 4995 may include one or more radios capable of transmitting and receiving signals using various suitable wireless communications techniques, and may be the same as or similar to transceiver 995b of FIG. 12.

Display 4980 may include any television type monitor or display, and may be the same as or similar to one or more of displays 380 and 680, and/or to display 980 of FIG. 12.

Storage 4962 may be implemented as a non-volatile storage device, and may be the same as or similar to non-volatile storage 962 of FIG. 12.

Graphics subsystem 4985 may perform processing of images such as still or video for display. Graphics subsystem 4985 may be a graphics processing unit (GPU) or a visual processing unit (VPU), for example. An analog or digital interface may be used to communicatively couple graphics subsystem 4985 and display 4980. For example, the interface may be any of a High-Definition Multimedia Interface, DisplayPort, wireless HDMI, and/or wireless HD compliant techniques. Graphics subsystem 4985 could be integrated into processor circuit 4950 or chipset 4955. Graphics subsystem 4985 could be a stand-alone card communicatively coupled to chipset 4955.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

In embodiments, content services device(s) 4900b may be hosted by any national, international and/or independent service and thus accessible to platform 4900a via the Internet, for example. Content services device(s) 4900b may be coupled to platform 4900a and/or to display 4980. Platform 4900a and/or content services device(s) 4900b may be coupled to a network 4999 to communicate (e.g., send and/or receive) media information to and from network 4999. Content delivery device(s) 4900c also may be coupled to platform 4900a and/or to display 4980.

In embodiments, content services device(s) 4900b may include a cable television box, personal computer, network, telephone, Internet enabled devices or appliance capable of delivering digital information and/or content, and any other similar device capable of unidirectionally or bidirectionally communicating content between content providers and platform 4900a and/display 4980, via network 4999 or directly. It will be appreciated that the content may be communicated unidirectionally and/or bidirectionally to and from any one of the components in system 4000 and a content provider via network 4999. Examples of content may include any media information including, for example, video, music, medical and gaming information, and so forth.

Content services device(s) 4900b receives content such as cable television programming including media information, digital information, and/or other content. Examples of content providers may include any cable or satellite television or radio or Internet content providers. The provided examples are not meant to limit embodiments.

In embodiments, platform 4900a may receive control signals from navigation controller 4920 having one or more navigation features. The navigation features of navigation controller 4920 may be used to interact with a user interface 4880, for example. In embodiments, navigation controller 4920 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 4920 may be echoed on a display (e.g., display 4980) by movements of a pointer, cursor, focus ring, or other visual indicators displayed on the display. For example, under the control of software applications 4940, the navigation features located on navigation controller 4920 may be mapped to virtual navigation features displayed on user interface 4880. In embodiments, navigation controller 4920 may not be a separate component but integrated into platform 4900a and/or display 4980. Embodiments, however, are not limited to the elements or in the context shown or described herein.

In embodiments, drivers (not shown) may include technology to enable users to instantly turn on and off platform 4900a like a television with the touch of a button after initial boot-up, when enabled, for example. Program logic may allow platform 4900a to stream content to media adaptors or other content services device(s) 4900b or content delivery device(s) 4900c when the platform is turned "off." In addition, chip set 4955 may include hardware and/or software support for 5.1 surround sound audio and/or high definition 7.1 surround sound audio, for example. Drivers may include a graphics driver for integrated graphics platforms. In embodiments, the graphics driver may include a peripheral component interconnect (PCI) Express graphics card.

In various embodiments, any one or more of the components shown in system 4000 may be integrated. For example, platform 4900a and content services device(s) 4900b may be integrated, or platform 4900a and content delivery device(s) 4900c may be integrated, or platform 4900a, content services device(s) 4900b, and content delivery device(s) 4900c may be integrated, for example. In various embodiments, platform 4900a and display 4890 may be an integrated unit. Display 4980 and content service device(s) 4900b may be integrated, or display 4980 and content delivery device(s) 4900c may be integrated, for example. These examples are not meant to limit embodiments.

In various embodiments, system 4000 may be implemented as a wireless system, a wired system, or a combination of both. When implemented as a wireless system, system 4000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 4000 may include components and interfaces suitable for communicating over wired communications media, such as I/O adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 4900a may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described.

Figure 14:
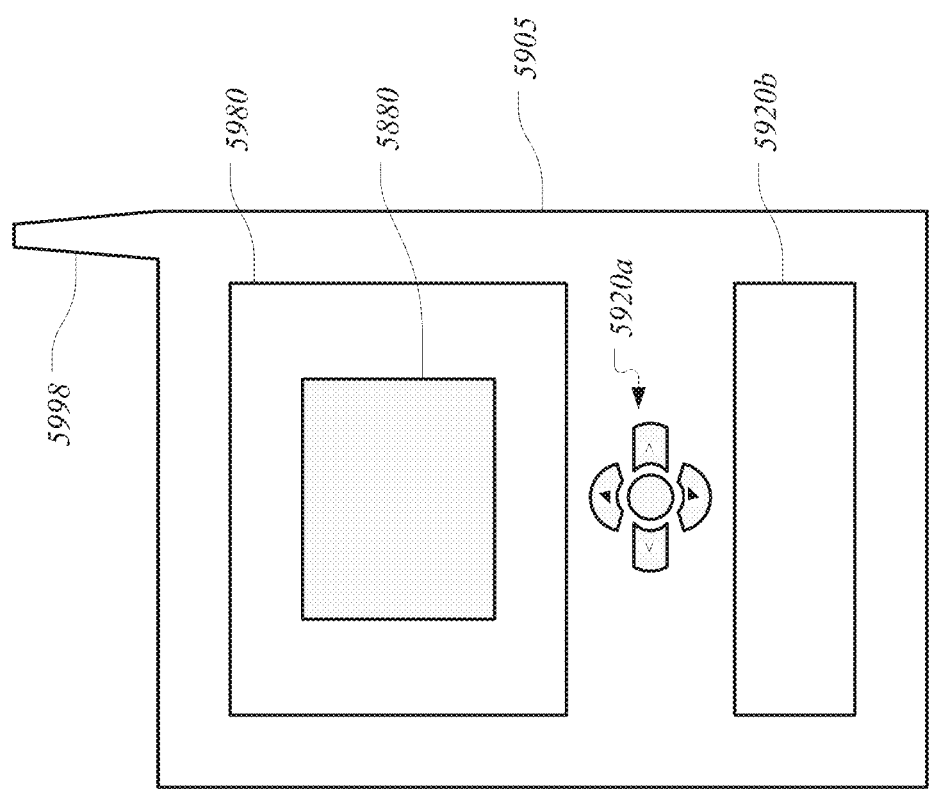
FIG. 14 illustrates an embodiment of a device.

As described above, system 4000 may be embodied in varying physical styles or form factors. FIG. 14 illustrates embodiments of a small form factor device 5000 in which system 4000 may be embodied. In embodiments, for example, device 5000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 14, device 5000 may include a display 5980, a navigation controller 5920a, a user interface 5880, a housing 5905, an I/O device 5920b, and an antenna 5998. Display 5980 may include any suitable display unit for displaying information appropriate for a mobile computing device, and may be the same as or similar to display 4980 in FIG. 13. Navigation controller 5920a may include one or more navigation features which may be used to interact with user interface 5880, and may be the same as or similar to navigation controller 4920 in FIG. 13. I/O device 5920b may include any suitable I/O device for entering information into a mobile computing device. Examples for I/O device 5920b may include an alphanumeric keyboard, a numeric keypad, a touch pad, input keys, buttons, switches, rocker switches, microphones, speakers, voice recognition device and software, and so forth. Information also may be entered into device 5000 by way of a microphone. Such information may be digitized by a voice recognition device. The embodiments are not limited in this context.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

In some examples, a device to receive data in visual light communications may include a processor component, a decoding component for execution by the processor component to analyze a marker pattern of a frame pattern in a captured image to determine whether the frame pattern is a useful frame pattern and to selectively decode a data pattern of the frame pattern to retrieve a packet of data based on the analysis.

Additionally or alternatively, the decoding component may analyze the marker pattern to distinguish a useful frame pattern from an unusable frame pattern that includes a portion of a new frame pattern not fully rendered onto a display of a sending device and a portion of a previous frame pattern still visually presented on the display.

Additionally or alternatively, the decoding component may analyze the marker pattern to distinguish a useful frame pattern from a duplicate frame pattern.

Additionally or alternatively, the device may include a depacketizing component for execution by the processor component to retrieve data from at least the packet of data.

Additionally or alternatively, the depacketizing component may retrieve metadata associated with the data from at least the packet of data.

Additionally or alternatively, the depacketizing component may employ the metadata to check the integrity of the data.

Additionally or alternatively, the device may include an interface to transmit the data to a destination device.

Additionally or alternatively, the device may include a capture component for execution by the processor component to operate a camera to capture multiple captured images of at least a portion of a display of a sending device at a selected capture rate, where the multiple captured images includes the captured image.

Additionally or alternatively, the capture component may receive an indication from the sending device of a display rate at which frame patterns are visually presented on the display and to derive the capture rate from the display rate.

Additionally or alternatively, the capture component may set the selected capture rate at twice the display rate.

Additionally or alternatively, the device may include the camera.

Additionally or alternatively, the decoding component may determine whether there is a rate of determination of frame patterns of the multiple captured images as useful frame patterns that remains consistent through a selected number of useful frame patterns, and may selectively examine marker patterns of frame patterns of the multiple captured images based on the rate in response.

Additionally or alternatively, the marker pattern may be disposed about the periphery of the data pattern, and the marker pattern may include multiple markers that differ between adjacent ones of frame patterns of the multiple captured images.

In some examples, a device to send data in visual light communications may include a processor component; and an encoding component for execution by the processor component to encode a packet of data into a data pattern, generate a frame pattern that includes the data pattern and a marker pattern extending about a periphery of the data pattern, and select the marker pattern to differ from a marker pattern of a previously generated frame pattern.

Additionally or alternatively, the device may include a packetizing component for execution by the processor component to organize at least a portion of data into the packet of data.

Additionally or alternatively, the packetizing component may incorporate metadata associated with the data into the packet of data.

Additionally or alternatively, the packetizing component may generate the metadata from the data, where the metadata includes information to enable a check of integrity of the data.

Additionally or alternatively, the device may include an interface to receive the data from a source device.

Additionally or alternatively, the device may include a presentation component for execution by the processor component to visually present multiple frame patterns on a display at a selected display rate, where the multiple frame patterns include the frame pattern and the previously generated frame pattern.

Additionally or alternatively, the display rate may be selected to match a refresh rate at which an image is raster scan rendered onto the display.

Additionally or alternatively, the device may include the display.

Additionally or alternatively, the marker pattern may include multiple markers disposed about the periphery of the data pattern, and the encoding component may select the marker pattern to select the multiple markers to differ from corresponding markers of the marker pattern of the previously generated frame pattern.

Additionally or alternatively, the data pattern may have a generally rectangular shape and each marker of the multiple markers disposed in a vicinity of a corner of the generally rectangular shape.

Additionally or alternatively, each marker may include one of a black rectangular shape or a white rectangular shape.

In some examples, a computer-implemented method for receiving data in visual light communications may include analyzing a marker pattern of a frame pattern in a captured image to determine whether the frame pattern is a useful frame pattern, and selectively decoding a data pattern of the frame pattern to retrieve a packet of data based on the analysis.

Additionally or alternatively, the method may include analyzing the marker pattern to distinguish a useful frame pattern from an unusable frame pattern that includes a portion of a new frame pattern not fully rendered onto a display of a sending device and a portion of a previous frame pattern still visually presented on the display.

Additionally or alternatively, the method may include analyzing the marker pattern to distinguish a useful frame pattern from a duplicate frame pattern.

Additionally or alternatively, the method may include retrieving data from at least the packet of data.

Additionally or alternatively, the method may include retrieving metadata associated with the data from at least the packet of data.

Additionally or alternatively, the method may include checking the integrity of the data using the metadata.

Additionally or alternatively, the method may include transmitting the data to a destination device.

Additionally or alternatively, the method may include capturing multiple captured images of at least a portion of a display of a sending device at a selected capture rate, where the multiple captured images includes the captured image.

Additionally or alternatively, the method may include receiving an indication from the sending device of a display rate at which frame patterns are visually presented on the display, and deriving the capture rate from the display rate.

Additionally or alternatively, the method may include determining whether there is a rate of determination of frame patterns of the multiple captured images as useful frame patterns that remains consistent through a selected number of useful frame patterns, and selectively examining marker patterns of frame patterns of the multiple captured images based on the rate in response.

In some examples, at least one machine-readable storage medium includes instructions that when executed by a computing device, cause the computing device to analyze a marker pattern of a frame pattern in a captured image to determine whether the frame pattern is a useful frame pattern, and selectively decode a data pattern of the frame pattern to retrieve a packet of data based on the analysis.

Additionally or alternatively, the computing device may be caused to analyze the marker pattern to distinguish a useful frame pattern from an unusable frame pattern that includes a portion of a new frame pattern not fully rendered onto a display of a sending device and a portion of a previous frame pattern still visually presented on the display.

Additionally or alternatively, the computing device may be caused to analyze the marker pattern to distinguish a useful frame pattern from a duplicate frame pattern.

Additionally or alternatively, the computing device may be caused to retrieve data from at least the packet of data.

Additionally or alternatively, the computing device may be caused to retrieve metadata associated with the data from at least the packet of data.

Additionally or alternatively, the computing device may be caused to check the integrity of the data using the metadata.

Additionally or alternatively, the computing device may be caused to transmit the data to a destination device.

Additionally or alternatively, the computing device may be caused to capture multiple captured images of at least a portion of a display of a sending device at a selected capture rate, where the multiple captured images includes the captured image.

Additionally or alternatively, the computing device may be caused to receive an indication from the sending device of a display rate at which frame patterns are visually presented on the display, and derive the capture rate from the display rate.

Additionally or alternatively, the computing device may be caused to determine whether there is a rate of determination of frame patterns of the multiple captured images as useful frame patterns that remains consistent through a selected number of useful frame patterns, and selectively examine marker patterns of frame patterns of the multiple captured images based on the rate in response.

In some examples, a computer-implemented method for sending data in visual light communications may includes encoding a packet of data into a data pattern, generating a frame pattern that includes the data pattern and a marker pattern extending about a periphery of the data pattern, and selecting the marker pattern to differ from a marker pattern of a previously generated frame pattern.

Additionally or alternatively, the method may include organizing at least a portion of data into the packet of data.

Additionally or alternatively, the method may include incorporating metadata associated with the data into the packet of data.

Additionally or alternatively, the method may include generating the metadata from the data, where the metadata includes information to enable a check of integrity of the data.

Additionally or alternatively, the method may include visually presenting multiple frame patterns on a display at a selected display rate, where the multiple frame patterns include the frame pattern and the previously generated frame pattern.

Additionally or alternatively, the method may include selecting the display rate to match a refresh rate at which an image is raster scan rendered onto the display.

Additionally or alternatively, the marker pattern may include multiple markers disposed about the periphery of the data pattern, and the method may include selecting the marker pattern to select the multiple markers to differ from corresponding markers of the marker pattern of the previously generated frame pattern.

Additionally or alternatively, the data pattern may have a generally rectangular shape and each marker of the multiple markers disposed in a vicinity of a corner of the generally rectangular shape.

In some examples, at least one machine-readable storage medium may include instructions that when executed by a computing device, cause the computing device to encode a packet of data into a data pattern, generate a frame pattern that includes the data pattern and a marker pattern extending about a periphery of the data pattern, and select the marker pattern to differ from a marker pattern of a previously generated frame pattern.

Additionally or alternatively, the computing device may be caused to organize at least a portion of data into the packet of data.

Additionally or alternatively, the computing device may be caused to incorporate metadata associated with the data into the packet of data.

Additionally or alternatively, the computing device may be caused to generate the metadata from the data, where the metadata includes information to enable a check of integrity of the data.

Additionally or alternatively, the computing device may be caused to visually present multiple frame patterns on a display at a selected display rate, where the multiple frame patterns include the frame pattern and the previously generated frame pattern.

Additionally or alternatively, the computing device may be caused to select the display rate to match a refresh rate at which an image is raster scan rendered onto the display.

Additionally or alternatively, the marker pattern may include multiple markers disposed about the periphery of the data pattern, and the computing device may be caused to select the marker pattern to select the multiple markers to differ from corresponding markers of the marker pattern of the previously generated frame pattern.

Additionally or alternatively, the data pattern may have a generally rectangular shape and each marker of the multiple markers disposed in a vicinity of a corner of the generally rectangular shape.

In some embodiments, at least one machine-readable storage medium may include instructions that when executed by a computing device, cause the computing device to perform any of the above.

In some embodiments, an device to compress and/or visually present video frames may include means for performing any of the above.

The invention claimed is:

1. A device to receive data in visual light communications comprising:
   a processor component; and
   a decoding component for execution by the processor component to analyze a marker pattern of a frame pattern in a captured image to determine whether the frame pattern is a useful frame pattern, and to selectively decode a data pattern of the frame pattern to retrieve a packet of data based on the analysis, the marker pattern alternating between adjacent frame patterns.

2. The device of claim 1, the decoding component to analyze the marker pattern to distinguish a useful frame pattern from an unusable frame pattern comprising a portion of a new frame pattern not fully rendered onto a display of a sending device and a portion of a previous frame pattern still visually presented on the display.

3. The device of claim 1, comprising a depacketizing component for execution by the processor component to retrieve data from at least the packet of data.

4. The device of claim 3, the depacketizing component to retrieve metadata associated with the data from at least the packet of data.

5. The device of claim 3, comprising an interface to transmit the data to a destination device.

6. The device of claim 1, comprising a capture component for execution by the processor component to operate a camera to capture multiple captured images of at least a portion of a display of a sending device at a selected capture rate, the multiple captured images comprising the captured image.

7. The device of claim 6, the capture component to receive an indication from the sending device of a display rate at which frame patterns are visually presented on the display and to derive the capture rate from the display rate.

8. A device to send data in visual light communications comprising:
   a processor component; and
   an encoding component for execution by the processor component to encode a packet of data into a data pattern, generate a frame pattern comprising the data pattern and a marker pattern extending about a periphery of the data pattern, and select the marker pattern to alternate between adjacent frame patterns.

9. The device of claim 8, comprising a packetizing component for execution by the processor component to organize at least a portion of data into the packet of data.

10. The device of claim 8, comprising a presentation component for execution by the processor component to visually present multiple frame patterns on a display at a selected display rate.

11. The device of claim 8, the marker pattern comprising multiple markers disposed about the periphery of the data pattern, the encoding component to select the marker pattern to select the multiple markers to differ from corresponding markers of the marker pattern of the adjacent frame patterns.

12. The device of claim 11, the data pattern having a generally rectangular shape and each marker of the multiple markers disposed in a vicinity of a corner of the generally rectangular shape.

13. A computer-implemented method for receiving data in visual light communications comprising:
   analyzing a marker pattern of a frame pattern in a captured image to determine whether the frame pattern is a useful frame pattern, the marker pattern alternating between adjacent frame patterns; and
   selectively decoding a data pattern of the frame pattern to retrieve a packet of data based on the analysis.

14. The computer-implemented method of claim 13, the method comprising analyzing the marker pattern to distinguish a useful frame pattern from an unusable frame pattern comprising a portion of a new frame pattern not fully rendered onto a display of a sending device and a portion of a previous frame pattern still visually presented on the display.

15. The computer-implemented method of claim 13, the method comprising retrieving data from at least the packet of data.

16. The computer-implemented method of claim 15, the method comprising retrieving metadata associated with the data from at least the packet of data.

17. The computer-implemented method of claim 16, the method comprising checking the integrity of the data using the metadata.

18. The computer-implemented method of claim 13, the method comprising capturing multiple captured images of at least a portion of a display of a sending device at a selected capture rate, the multiple captured images comprising the captured image.

19. The computer-implemented method of claim 18, the method comprising:
   determining whether there is a rate of determination of frame patterns of the multiple captured images as useful frame patterns that remains consistent through a selected number of useful frame patterns; and
   selectively examining marker patterns of frame patterns of the multiple captured images based on the rate in response.

20. At least one non-transitory machine-readable storage medium comprising instructions that when executed by a computing device, cause the computing device to:
   analyze a marker pattern of a frame pattern in a captured image to determine whether the frame pattern is a useful frame pattern, the marker pattern alternating between adjacent frame patterns; and
   selectively decode a data pattern of the frame pattern to retrieve a packet of data based on the analysis.

21. The at least one non-transitory machine-readable storage medium of claim 20, the computing device caused to analyze the marker pattern to distinguish a useful frame pattern from an unusable frame pattern comprising a portion of a new frame pattern not fully rendered onto a display of a sending device and a portion of a previous frame pattern still visually presented on the display.

22. The at least one non-transitory machine-readable storage medium of claim 20, the computing device caused to analyze the marker pattern to distinguish a useful frame pattern from a duplicate frame pattern.

23. The at least one non-transitory machine-readable storage medium of claim 20, the computing device caused to retrieve data from at least the packet of data.

24. The at least one non-transitory machine-readable storage medium of claim 20, the computing device caused to capture multiple captured images of at least a portion of a display of a sending device at a selected capture rate, the multiple captured images comprising the captured image.

25. The at least one non-transitory machine-readable storage medium of claim 24, the computing device caused to:
   receive an indication from the sending device of a display rate at which frame patterns are visually presented on the display; and
   derive the capture rate from the display rate.

* * * * *